(12) United States Patent
Tanaka (10) Patent No.: US 9,436,069 B2
(45) Date of Patent: Sep. 6, 2016

(54) LIGHT SOURCE UNIT AND PROJECTOR

(71) Applicant: Seiko Epson Corporation, Tokyo (JP)

(72) Inventor: Katsunori Tanaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 14/207,107

(22) Filed: Mar. 12, 2014

(65) Prior Publication Data

US 2014/0293241 A1 Oct. 2, 2014

(30) Foreign Application Priority Data

Mar. 26, 2013 (JP) .................................. 2013-063559

(51) Int. Cl.
*G03B 21/16* (2006.01)
*G03B 21/14* (2006.01)
*G03B 21/20* (2006.01)

(52) U.S. Cl.
CPC .............. *G03B 21/16* (2013.01); *G03B 21/145* (2013.01); *G03B 21/2026* (2013.01)

(58) Field of Classification Search
CPC .. G03B 21/16; G03B 21/006; G03B 21/145; G03B 21/2026; G03B 21/2033
USPC ................ 353/57, 60–61; 362/294, 362, 373
See application file for complete search history.

(56) References Cited

U.S. PATENT DOCUMENTS

| | | | |
|---|---|---|---|
| 6,481,854 B1 * | 11/2002 | Sugawara et al. ............... | 353/52 |
| 8,322,861 B2 * | 12/2012 | Tsai ......................... | F21V 29/02 353/52 |
| 8,403,497 B2 * | 3/2013 | Hsiao ...................... | G03B 21/16 353/119 |
| 8,523,365 B2 | 9/2013 | Nagarekawa et al. | |
| 2004/0095559 A1 * | 5/2004 | Arai et al. ...................... | 353/57 |
| 2011/0234987 A1 * | 9/2011 | Tanaka .................... | F21V 29/02 353/52 |
| 2012/0019790 A1 * | 1/2012 | Nagarekawa et al. .......... | 353/98 |
| 2012/0154761 A1 * | 6/2012 | Lin ......................... | G03B 21/16 353/58 |

FOREIGN PATENT DOCUMENTS

JP 2012-27171 A 2/2012

* cited by examiner

*Primary Examiner* — Sultan Chowdhury
(74) *Attorney, Agent, or Firm* — ALG Intellectual Property, LLC (57) ABSTRACT

A light source unit including: a light source; a reflector configured to reflect light emitted from the light source; a light source housing configured to accommodate the light source and the reflector, and including an inflow port through which cooling air enters, and a first flow channel and a second flow channel guiding the cooling air entering from the inflow port to an upper portion and a lower portion of the light source respectively; and a rectifying unit configured to rotate and allow the cooling air entering from the inflow port to flow in the first flow channel, wherein the rectifying unit is provided with an opening configured to allow part of the cooling air entering from the inflow port to flow in the second flow channel.

16 Claims, 9 Drawing Sheets

LIGHT SOURCE UNIT AND PROJECTOR

BACKGROUND

1. Technical Field

The present invention relates to a light source unit and a projector.

2. Related Art

In the related art, a projector configured to modulate light emitted from a light source unit in accordance with image information and project the modulated light onto a projection surface such as a screen is known. In the light source unit, a discharging type light source such as an extra high pressure mercury lamp is employed. The light source generates heat in association with a light emission, and the temperature of an upper portion thereof is increased to a temperature higher than the temperature of a lower portion thereof due to an influence of heat convection. When a high-temperature state of the light source continues, the light source is subjected to loss of clarity, is blackened and hence is deteriorated with an increase in a temperature difference between the upper portion and the lower portion.

The projector is used in a standing position in which the projector is placed on a desk or on a floor, and in a suspending position which is a position to be installed upside down, that is, a position inverted from the standing position, on a ceiling or the like. Therefore, when a flow channel configured to cool the light source unit is fixed corresponding to either one of the standing position or the suspending position, there arises a problem that the light source unit cannot be cooled adequately in the other position.

Therefore, a technology configured to cool the light source efficiently in both of the standing position and the suspending position is proposed (for example, see JP-A-2012-27171).

The light source unit described in JP-A-2012-27171 includes a light-emitting tube, a reflector, and a holding unit configured to hold the reflector.

The holding unit includes an intake port 32, a partitioning portion provided between the intake port 32 and the light-emitting tube, a pair of flow channels provided so as to be branched to an upper side and a lower side of the light-emitting tube, and a shutter configured to rotate under its own weight. The intake port 32 is formed so as to introduce cooling air in a direction substantially orthogonal to a lighting optical axis, and the partitioning portion is provided with an opening 38. The shutter is formed so as to rotate about an axis of rotation extending substantially parallel to the lighting optical axis and close the lower flow channel, and is provided with an opening 42 that overlaps with the opening 38 of the partitioning portion on the axis of rotation side.

The light source unit described in JP-A-2012-27171 is configured to allow the cooling air introduced from the intake port 32 to flow through the upper flow channel, which is one of the pair of flow channels not closed by the shutter, toward the light-emitting tube. Part of the cooling air introduced from the intake port 32 is directed to flow along the light-emitting tube via the openings 38 and 42. Therefore, the light source unit described in JP-A-2012-27171 is configured to cool the light-emitting tube from above and from the sides in both positions, that is, the standing position and the suspending position simultaneously.

However, the light source unit described in JP-A-2012-27171 is configured to close one of the flow channels with the shutter, the light source unit is liable to be deteriorated due to lack of the cooling air to a lower part of the light-emitting tube or a high temperature of a part of the holding unit which defines the flow channel. Since the intake port 32 is formed so as to introduce the cooling air in the direction substantially orthogonal to the lighting optical axis, a space in which a fan that sends the cooling air to the intake port 32 is placed is increased in size, so that an apparatus having the light source unit is increased in size correspondingly. Since the intake port 32, the openings 38 and 42, and a distal end of the light-emitting tube are arranged so as to be positioned in a line, there is a problem that light is liable to leak to the outside of the light source unit.

SUMMARY

An advantage of some aspects of the invention is to solve at least a part of the problems described above, and the invention can be implemented as the following forms or application examples.

Application Example 1

A first aspect of this disclosure according to this application example includes a light source unit including: a light source configured to emit light; a reflector configured to reflect the light emitted from the light source; a light source housing configured to accommodate the light source and the reflector and including an inflow port through which cooling air enters, and a first flow channel and a second flow channel that guide the cooling air entering from the inflow port to an upper portion and a lower portion of the light source respectively; and a rectifying unit configured to rotate and cause the cooling air entering from the inflow port to flow in the first flow channel, wherein the rectifying unit is provided with an opening configured to cause part of the cooling air entering from the inflow port to flow in the second flow channel.

In this configuration, the light source unit includes the first flow channel, the second flow channel, and the rectifying unit configured to move by being rotated, and the rectifying unit is provided with the opening. Accordingly, even when the light source unit is inverted upside down, the cooling air entering from the inflow port is guided mainly to the first flow channel by the rectifying unit and is fed to the upper portion of the light source, and part of the cooling air flows in the second flow channel to be fed to the lower portion of the light source. The cooling air flowing in the second flow channel cools a portion of the light source housing which defines the second flow channel and the light source housing positioned below the light source. Therefore, in the light source unit, the upper portion and the lower portion of the light source is cooled with the right equilibrium by the cooling air entering from the inflow port, and the light source housing is effectively cooled. Therefore, the light source unit with longer lifetime even in a usage in the position inverted upside down is provided.

Application Example 2

In the light source unit of the application example described above, it is preferable that the light source housing includes: a housing body configured to accommodate the light source and the reflector, and a duct member configured to define the first flow channel and the second flow channel in cooperation with the housing body, wherein the inflow port allows entry of the cooling air from a direction along an optical axis of the light source, and the rectifying unit is supported by the housing body and the duct member so as to rotate about a center axis that intersects a perpendicular plane including the optical axis.

In this configuration, the rectifying unit is supported by the housing body and the duct member, and is configured to rotate about the center axis intersecting the perpendicular plane including the optical axis of the light source. Accordingly, a configuration in which the rectifying unit can be rotated under its own weight is achieved in a simple structure, cooling air entering from the direction along the optical axis is caused to flow mainly in the first flow channel, and part of the entering cooling air is caused to flow into the second flow channel.

The inflow port is formed so as to allow entry of the cooling air from the direction along the optical axis. Accordingly, space saving in a direction orthogonal to the optical axis is achieved, so that a fan configured to feed the cooling air to the inflow port may be arranged and, consequently, an increase in size of the apparatus provided with the light source unit is suppressed.

Since the light source is hardly visible from the inflow port, the light source unit configured to suppress light leakage to the outside is provided.

Application Example 3

In the light source unit of the application example described above, it is preferable that the duct member includes a duct side surface configured to support one side of the rectifying unit, and the rectifying unit includes a first end on the duct-side-surface side of the opening.

In this configuration, the rectifying unit is supported at the one side by the duct side surface and the first end is provided on the duct-side-surface side of the opening. Accordingly, the cooling air flowing from the opening into the second flow channel is suppressed from hitting directly against the duct side surface, whereby the cooling air is suppressed from having difficulty to flow by hitting against the duct side surface, so that the cooling air is allowed to flow efficiently in the second flow channel.

Application Example 4

In the light source unit of the application example described above, it is preferable that the housing body includes a body side surface configured to support the other side of the rectifying unit, and the body side surface includes an inlet port configured to introduce part of the cooling air entering from the inflow port to the interior of the housing body, and the rectifying unit includes a second end on the body-side-surface side of the opening.

In this configuration, the rectifying unit is supported at the other side thereof by the body side surface and the second end is provided on the body-side-surface side of the opening. Accordingly, the cooling air flowing from the opening into the second flow channel is suppressed from hitting directly against the body side surface, whereby the cooling air is suppressed from having difficulty to flow by hitting against the body side surface, so that the cooling air is allowed to flow efficiently in the second flow channel.

Since the housing body is provided with the inlet port, the cooling air is allowed to flow to the light source from a portion other than the upper portion and the lower portion of the light source. Since the second end of the rectifying unit is positioned in the vicinity of the inlet port, the cooling air is introduced to the inlet port stably by the second end.

The light source unit capable of cooling the light source and the light source housing further efficiently is provided.

Application Example 5

In the light source unit of the application example described above, it is preferable that the housing body includes a body side surface configured to support the other side of the rectifying unit, and the body side surface includes an inlet port configured to introduce part of the cooling air entering from the inflow port to the interior of the housing body, and the opening of the rectifying unit is provided to an edge end on the body-side-surface side of the rectifying unit.

In this configuration, the rectifying unit is supported at the other side by the body side surface and the opening is formed to the edge end of the body side surface. Accordingly, in comparison with the configuration in which the rectifying unit includes the second end, the amount of cooling air that enters the inlet port may be reduced, and the amount of cooling air that is allowed to flow in the second flow channel is increased. Therefore, in the case where the light source unit includes the light source which requires cooling of the lower portion of the light source than the upper portion, the upper portion and the lower portion of the light source are cooled in the right equilibrium while allowing the cooling air to flow to the light source from the portion other than the upper portion and the lower portion of the light source, so that the light source unit having longer lifetime in the usage in the position inverted upside down is provided.

Application Example 6

In the light source unit of the application example described above, it is preferable that the rectifying unit is provided with a center axis of rotation at one end side, and the opening at the other end side.

In this configuration, the opening is provided at the end of the rectifying unit on the opposite side to the center axis. Accordingly, even when the rectifying unit is formed so that the one end side of the rectifying unit has a shape smaller than the other end side, the opening having a desired shape is ensured. Therefore, by saving the space for accommodating the rectifying unit, that is, by achieving reduction in the size of the light source unit, the light source unit in which a desired amount of cooling air is flowed in the first flow channel and the second flow channel is provided.

Application Example 7

A projector of this application example includes the light source unit according to any one of the application examples described above; a light-modulating unit configured to modulate light emitted from the light source unit in accordance with image information; and a projection lens configured to project the light modulated by the light-modulating unit.

In this configuration, since the projector includes the above-described light source unit, stable projection for a long term is achieved in the standing position in which the projector is placed on a floor or a desk and in the suspending position in which the projector is inverted upside down from the standing position and is suspended from the ceiling or the like.

BRIEF DESCRIPTION OF THE DRAWINGS

The invention will be described with reference to the accompanying drawings wherein like numbers reference like elements.

DESCRIPTION OF EXEMPLARY EMBODIMENTS

First Embodiment

Referring now to the drawings, a projector of a first embodiment will be described.

The projector of the first embodiment is configured to modulate light emitted from a light source in accordance with image information and project the modulated light on a projected surface such as a screen in an enlarged scale. The projector of the first embodiment is configured to allow projection both in a standing position and a suspending position.

Principal Configuration of Projector

Figure 1:
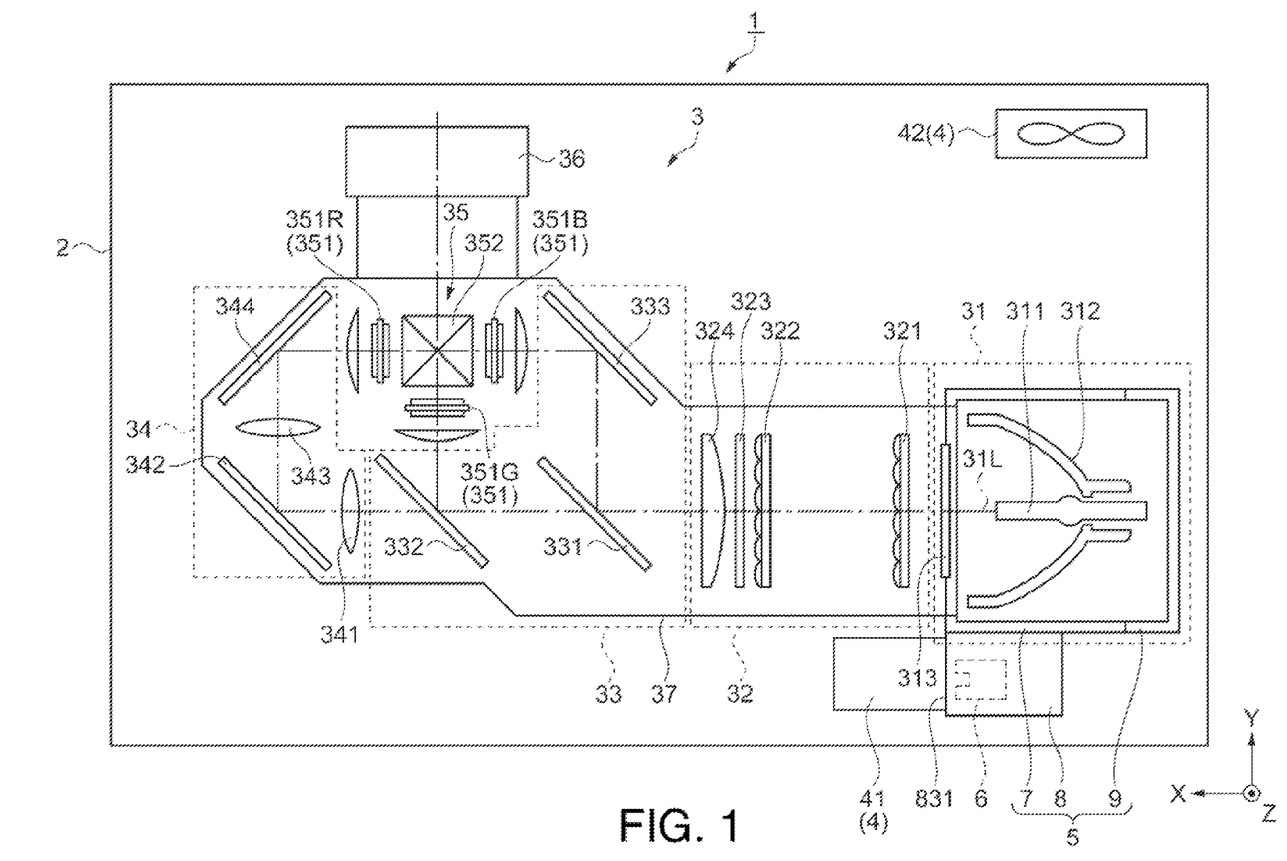
FIG. 1 is a diagrammatic drawing illustrating a schematic configuration of a projector of a first embodiment.

FIG. 1 is a diagrammatic drawing showing a schematic configuration of a projector 1 of the embodiment.

As illustrated in FIG. 1, the projector 1 includes an external housing 2 constituting an outer shell, a control unit (not illustrated), an optical unit 3 having a light source unit 31 and a cooling unit 4. Although not illustrated in the drawing, a power supply unit configured to supply power to the light source unit 31 and the control unit are arranged in the interior of the external housing 2.

Although detailed description is omitted, the external housing 2 includes a plurality of members and is provided with an air intake port for taking in outside air and an exhaust port for exhausting warmed air in the interior of the external housing 2 to the outside.

The control unit including a CPU (Central Processing Unit), a ROM (Read Only Memory), a RAM (Random Access Memory) functions as a computer, and is configured to control the operation of the projector 1, for example, control relating to projection of images.

Configuration of Optical Unit

The optical unit 3 optically processes the light emitted from the light source unit 31 and projects the same under the control of the control unit.

The optical unit 3 includes, in addition to the light source unit 31, an integrator lighting optical system 32, a color separating optical system 33, a relay optical system 34, an electric optical unit 35, a projection lens 36, and an optical component housing 37 configured to arrange these optical components 31 to 36 at predetermined positions on an optical path as illustrated in FIG. 1.

The optical unit 3 is formed into a substantially L-shape in plan view as illustrated in FIG. 1, and includes the light source unit 31 demountably arranged at one end portion thereof and the projection lens 36 arranged on the other end portion thereof. In the following description, a direction in which light goes out from the light source unit 31 is described as +X direction, a direction in which light is emitted from the projection lens 36 is described as +Y direction (front side), and an upward direction of the projector 1 in the standing position is described as +Z direction for the sake of convenience of description.

The light source unit 31 includes a discharge type light source 311 including an extra-high pressure mercury lamp or a metal halide lamp, a reflector 312, a collimator lens 313, a light source housing 5, and a rectifying unit 6.

Figure 2:
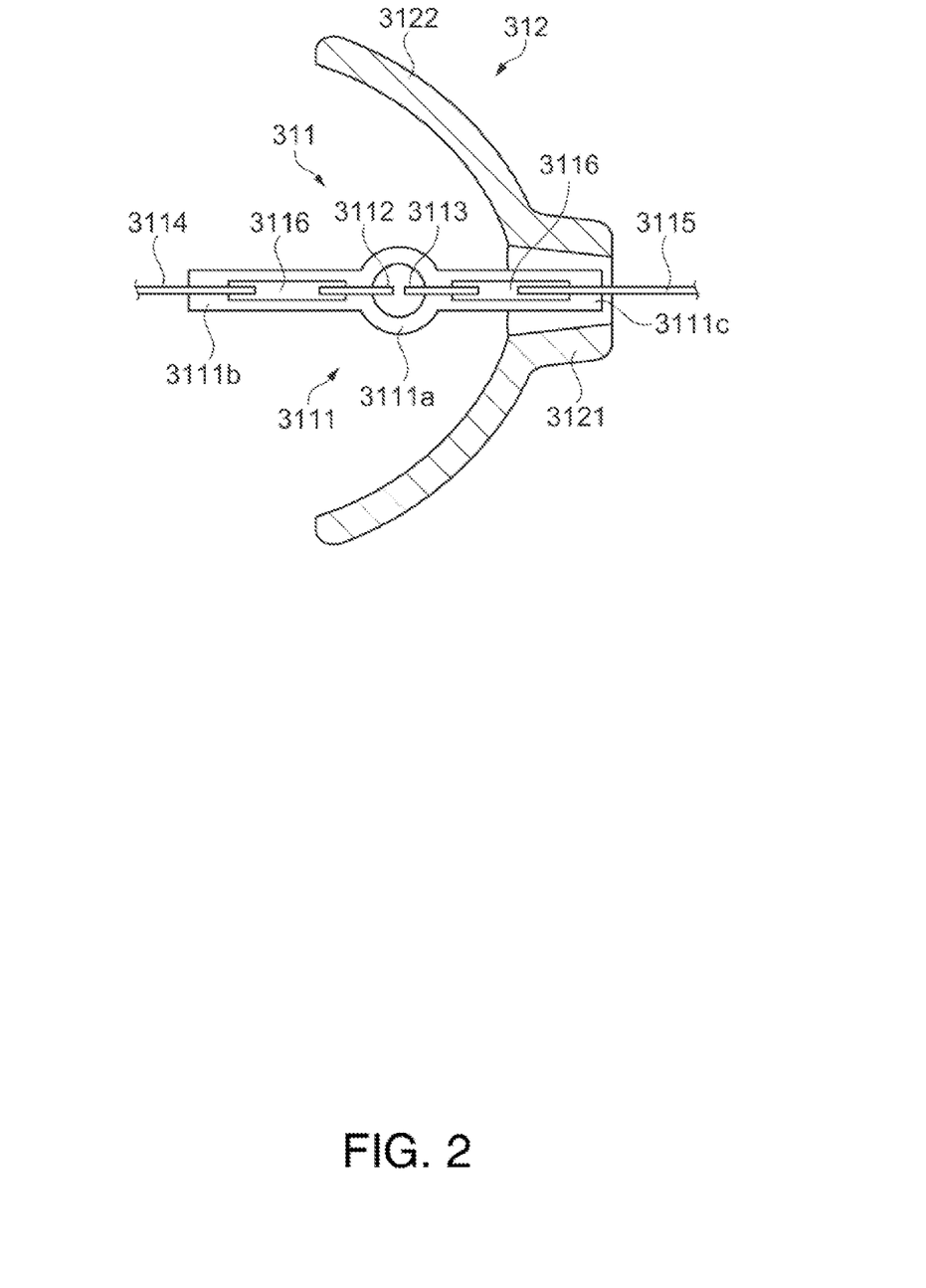
FIG. 2 is a cross-sectional view of a light source and a reflector of the first embodiment.

FIG. 2 is a cross sectional view of the light source 311 and the reflector 312.

The light source 311 includes a light-emitting tube 3111, a pair of electrodes 3112 and 3113, and lead wires 3114 and 3115 as illustrated in FIG. 2.

The light-emitting tube 3111 is formed of heat-resistant glass such as quartz glass, and includes a spherical light-emitting portion 3111a provided at a center, and a pair of sealing portions 3111b and 3111c extending from both sides of the light-emitting portion 3111a as illustrated in FIG. 2.

A discharging space in which mercury, noble gas, and halogen are sealed is formed in the light-emitting portion 3111a, and the pair of electrodes 3112 and 3113 are arranged in the discharging space with distal ends thereof face each other in the proximity.

A pair of metallic foils 3116 configured to be electrically connected to the electrodes 3112 and 3113 respectively are arranged in the interiors of the pair of sealing portions 3111b and 3111c.

The lead wires 3114 and 3115 are connected to the pair of the metallic foils 3116 and extend to the outside of the sealing portions 3111b and 3111c. When power is supplied to the lead wires 3114 and 3115, electric discharge occurs between the opposed electrodes 3112 and 3113, so that the light source 311 emits light.

The light source 311 generates heat by a light emission of the light-emitting tube 3111. A temperature rise is significant in an upper portion of the light source 311 than in a lower portion thereof due to an influence of heat convection or the like and, specifically, the temperature near a surface of an upper portion of the light-emitting portion 3111a is liable to rise.

If the temperature of the upper portion of the light-emitting portion 3111a rises excessively due to insufficient cooling, a base material is recrystallized, and hence white turbidity occurs. In contrast, if the temperature of a lower portion of the light-emitting portion 3111a is lowered excessively due to the excessing cooling, a halogen cycle is not performed normally in the electrodes 3112 and 3113, and hence a base material of the electrodes 3112 and 3113 is adhered to an inner wall of the light-emitting portion 3111a, whereby blackening may occur. If the white turbidity or the blackening occurs, the corresponding part loses its clarity, and hence light amount emitted from the light-emitting portion 3111a is reduced, and breakage or deterioration of the light-emitting tube 3111 may result due to a high temperature. Therefore, when cooling the light-emitting tube 3111, it is preferable to start cooling from the upper side of the light-emitting tube 3111 to avoid generation of a temperature difference between the upper portion and the lower portion.

The temperature of the sealing portion 3111b, which is positioned in an area of light emitted from the light-emitting portion 3111a, is liable to rise and, for example, the temperature of a connecting portion between the metallic foils 3116 and the lead wire 3114 rises significantly. If these portions are not sufficiently cooled, the metallic foils 3116 are oxidized and hence are blackened. Consequently, absorption of light is accelerated and hence the temperature further increases, so that the breakage or deterioration of the light-emitting tube 3111 may result. Therefore, when cooling the light source 311, it is preferable to cool also the sealing portion 3111*b* effectively in addition to the light-emitting portion 3111*a*.

The reflector 312 has a cylindrical neck portion 3121 and a reflecting portion 3122 widening from the neck portion 3121 in a substantially concave shape in cross section as illustrated in FIG. 2.

The neck portion 3121 is provided with an insertion hole configured to insert the sealing portion 3111*c*. The light source 311 includes the sealing portion 3111*b* positioned on a side opposite to the neck portion 3121. An adhesive agent is injected between the sealing portion 3111*c* and the insertion hole, so that the light source 311 is fixed to the reflector 312.

The reflecting portion 3122 includes a metal thin film deposited on an inner surface thereof so as to reflect the light emitted from the light-emitting portion 3111*a* to a direction away from the neck portion 3121.

The light source unit 31 is configured to reflect the light emitted from the light source 311 by the reflector 312 and then align the direction of ejection by the collimator lens 313, and eject the light toward the integrator lighting optical system 32.

The light source housing 5 accommodates the light source 311 and the reflector 312, and is provided with a plurality of flow channels which allow passage of cooling air fed from the cooling unit 4.

The rectifying unit 6 is configured to rotate in accordance with the standing position and the suspending position of the projector 1, and adjust the amount of the cooling air to be flowed into the plurality of flow channels provided in the light source housing 5 to achieve effective cooling of the light source unit 31. The light source housing 5 and the rectifying unit 6 will be described later in detail.

Returning back to FIG. 1, the integrator lighting optical system 32 includes a first lens array 321, a second lens array 322, a polarization converter 323, and a superimposing lens 324, and is configured so that the light emitted from the light source unit 31 is irradiated substantially uniformly on a surface of a liquid crystal light valve 351, which will be described later, and is used effectively.

The color separating optical system 33 includes two dichroic mirrors 331 and 332 and a reflection mirror 333, and has a function to separate the light emitted from the integrator lighting optical system 32 into three color lights; a red light (hereinafter, referred to as "R-light"), a green light (hereinafter, referred to as "G-light"), and a blue light (hereinafter, referred to as "B-light").

The relay optical system 34 includes an incident-side lens 341, a relay lens 343, and reflection mirrors 342 and 344, and has a function to guide the R-light separated by the color separating optical system 33 to the liquid crystal light valve 351 for the R-light. The optical unit 3 has a configuration such that the relay optical system 34 guides the R-light, the invention is not limited thereto, and a configuration in which the B-light is guided is also applicable, for example.

The electric optical unit 35 includes the liquid crystal light valve 351 as a light-modulating unit and a cross-dichroic prism 352 as a color synthesizing optical system, and is configured to modulate respective color lights separated by the color separating optical system 33 in accordance with the image information, and combine the modulated color lights.

The liquid crystal light valve 351 is provided for each of the three color lights (a liquid crystal light valve for the R-light is denoted by 351R, a liquid crystal light valve for the G-light is denoted by 351G, and a liquid crystal light valve for the B-light is denoted by 351B), and each includes a transmissive liquid crystal panel, and an incident side polarizing plate and an outgoing side polarizing plate arranged on both surfaces thereof.

The liquid crystal light valve 351 includes a rectangular pixel area in which minute pixels, which are not illustrated, are formed in a matrix pattern, and the respective pixels are set to a light transmissivity in accordance with display image signals, whereby a display image is formed in the pixel area. Then, the respective color lights separated by the color separating optical system 33 are modulated by the liquid crystal light valve 351, and are emitted to the cross-dichroic prism 352.

The cross-dichroic prism 352 is formed into a substantially square shape in plan view by bonding four rectangular prisms, and two dielectric multilayer films are formed at an interface of bonded rectangular prisms. The cross-dichroic prism 352 is configured to reflect color lights modulated by the liquid crystal light valves 351R and 351B from the dielectric multilayer films, and allow color light modulated by the liquid crystal light valve 351G to pass therethrough to combine the respective color lights.

The projection lens 36 includes a plurality of lenses (which are not illustrated) and projects the light combined by the cross-dichroic prism 352 on the screen in an enlarged scale.

The cooling unit 4 includes a sirocco fan 41 arranged on the rear side (−Y direction) of the light source unit 31 and an axial flow fan 42 arranged on the front side (+Y direction) of the light source unit 31 as illustrated in FIG. 1.

Although detailed description will be given later, the sirocco fan 41 is configured to send the cooling air to an inflow port 831 provided in the light source housing 5 to cool the light source unit 31.

The axial flow fan 42 is configured to discharge air in the interior of the external housing 2, which is warmed up by cooling the light source unit 31, through the exhaust port of the external housing 2 to the outside thereof.

Configurations of Light Source Housing and Rectifying Unit

The light source housing 5 and the rectifying unit 6 will be described in detail now.

Figure 3:
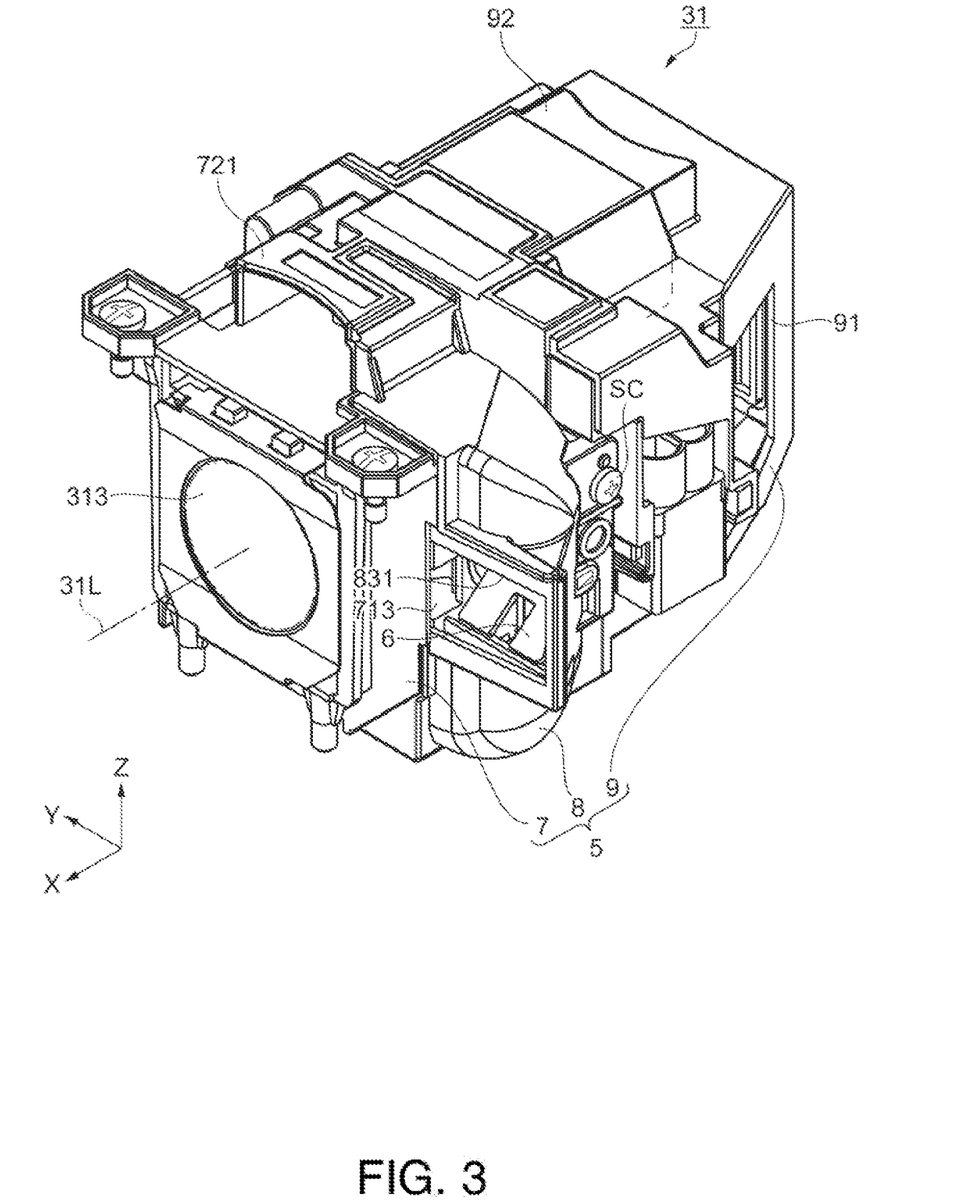
FIG. 3 is a perspective view of a light source unit of the first embodiment.

FIG. 3 is a perspective view of the light source unit 31. First of all, the light source housing 5 will be described. The light source housing 5 includes a housing body 7 configured to accommodate the light source 311 and the reflector 312 (see FIG. 2), a duct member 8 to be arranged on the −Y side of the housing body 7, and a cover 9 arranged on the −X side of the housing body 7 as illustrated in FIG. 3.

Figure 4:
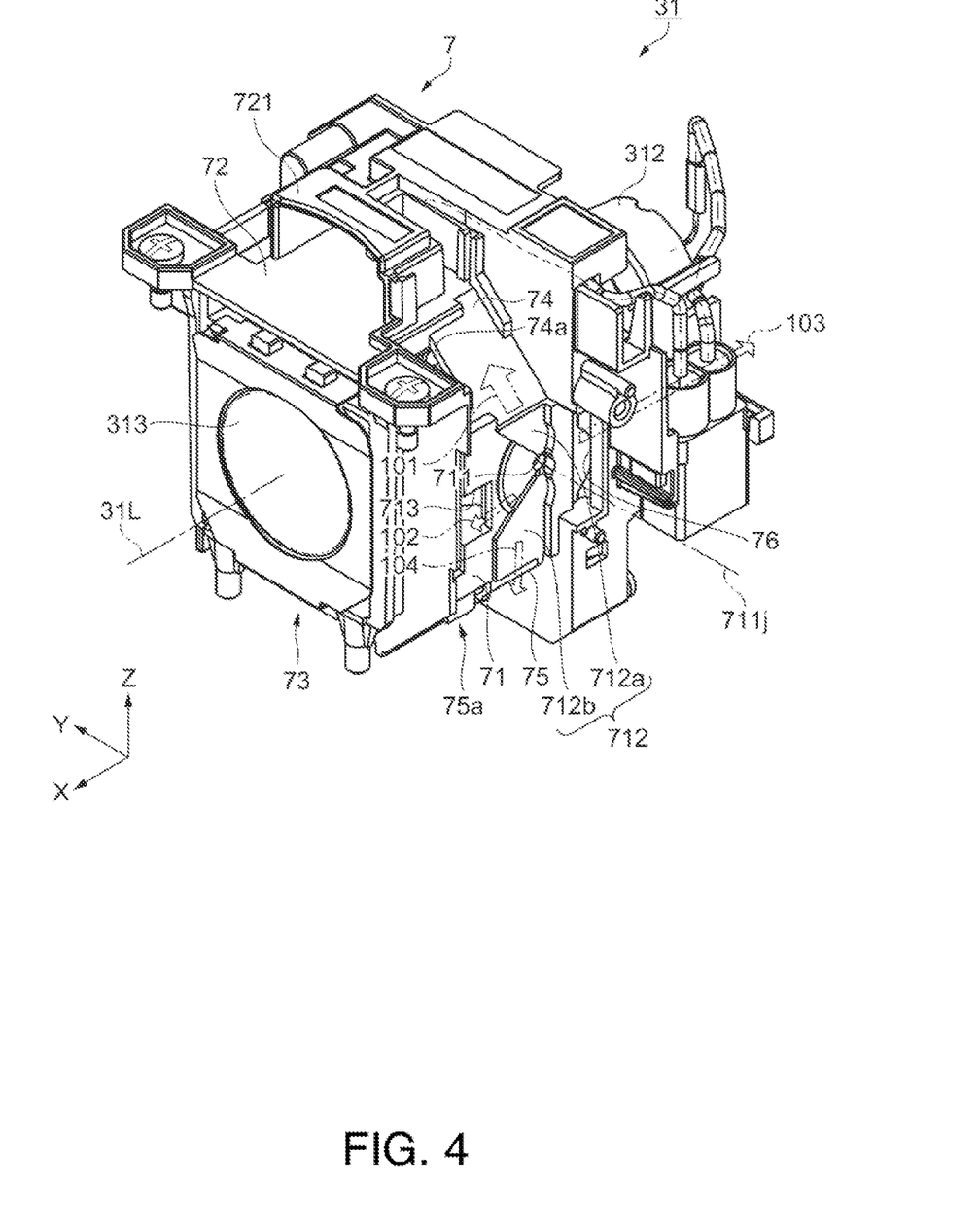
FIG. 4 is a perspective view of the light source unit of the first embodiment in a state in which a duct member and a cover are demounted.

FIG. 4 is a perspective view of the light source unit 31 from which the duct member 8 and the cover 9 are removed.

As illustrated in FIG. 4, the housing body 7 is formed into a substantially parallelepiped box shape, and is formed with openings on the +X side and −X side. Then, the collimator lens 313 is arranged at the opening on the +X side, and the reflector 312 to which the light source 311 is fixed is accommodated in the housing body 7 through the opening on the −X side.

The housing body 7 is formed by a wall portion (a body side surface 71) that defines a −Y side, and wall portions 72 and 73 that define respectively a +Z side and a −Z side, and includes inclined surface portions 74 and 75 at corners on the −Y side.

The wall portion 72 is formed with a gripping portion 721 projecting in the +Z direction. The gripping portion 721 and a gripping portion 92 (see FIG. 3), which will be described later, provided on the cover 9 are portions gripped by a user when the light source unit 31 is mounted or demounted, and the light source unit 31 is mounted on and demounted from the projector 1 by the user gripping the gripping portions 721 and 92 and moving the same in the Z direction.

The inclined surface portion 74 is provided between the body side surface 71 and the wall portion 72 and the inclined surface portion 74 is formed with a through hole (an outflow port 74a) as illustrated in FIG. 4. The inclined surface portion 75 is provided between the body side surface 71 and the wall portion 73 and the inclined surface portion 75 is formed with a through hole (an outflow port 75a).

The body side surface 71 is provided with a bearing 711, a rotation stopper portion 712, and an inlet port 713 as illustrated in FIG. 4.

The bearing 711 is a circular hole in plan view having a center at a center axis 711j extending in a direction substantially orthogonal to a perpendicular plane including an optical axis 31L of the light source 311, and a rotating shaft 62 (see FIG. 6A), which will be described later, of the rectifying unit 6 is inserted therethrough. The body side surface 71 rotatably supports the rectifying unit 6 by a duct side surface 8A (see FIG. 5B), which will be described later, of the duct member 8.

The rotation stopper portions 712 have a function to limit a range of rotation of the rectifying unit 6, and a pair of the rotation stopper portions 712 are provided so as to project outward of the body side surface 71. The rotation stopper portion 712 includes a rotation stopper portion 712 positioned on the +Z side of the bearing 711, and a rotation stopper portion 712b positioned on the −Z side of the bearing 711. The rotation stopper portion 712a and the rotation stopper portion 712b are in the proximity to each other in the vicinity of the bearing 711 and are inclined so as to extend away from each other as they go away from the bearing 711 in the +X direction.

The inlet port 713 is a through hole configured to allow part of cooling air flowing inward from the inflow port 831 into an interior of the housing body 7, and as illustrated in FIG. 4, is formed so as to be positioned between the pair of rotation stopper portions 712 in the +X direction of the bearing 711.

The housing body 7 is formed with a projecting portion projecting from the rotation stopper portions 712 in the −X side of the bearing 711, and the projecting portion is formed with a rectangular through hole 76 penetrating in the X direction as illustrated in FIG. 4. Although the illustration is omitted, the housing body 7 is provided with an exhaust port on a wall portion on the side opposite from the body side surface 71 to allow the air in the interior of the housing body 7 discharged therefrom to the outside.

The duct member 8 is mounted on the −Y side of the housing body 7 and defines a plurality of flow channels in cooperation with the housing body 7 as illustrated in FIG. 3.

Figure 5A:
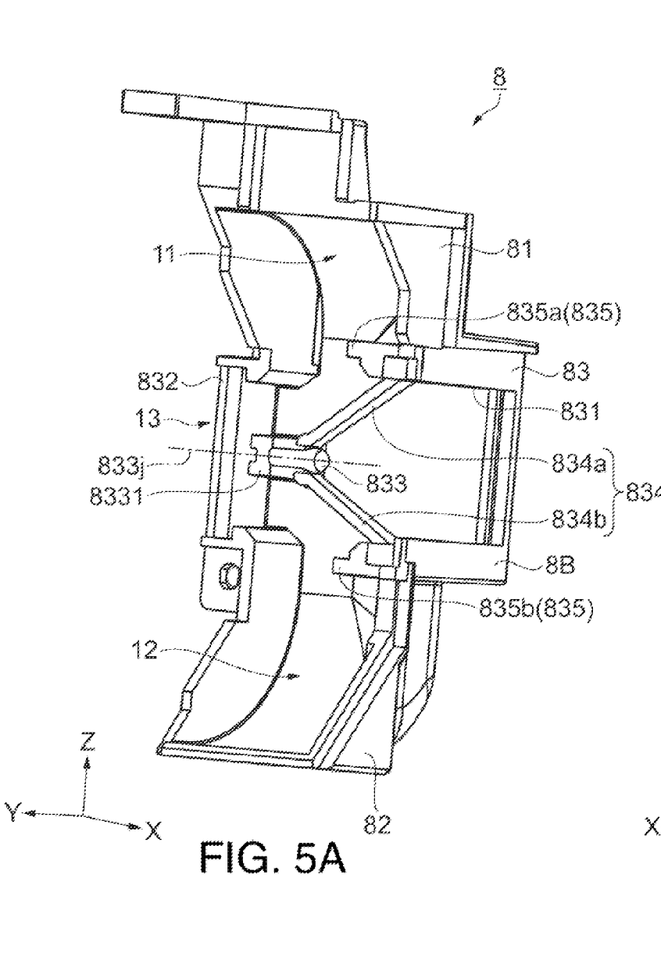
FIGS. 5A and 5B are perspective view illustrating the duct member of the first embodiment.
Figure 5B:
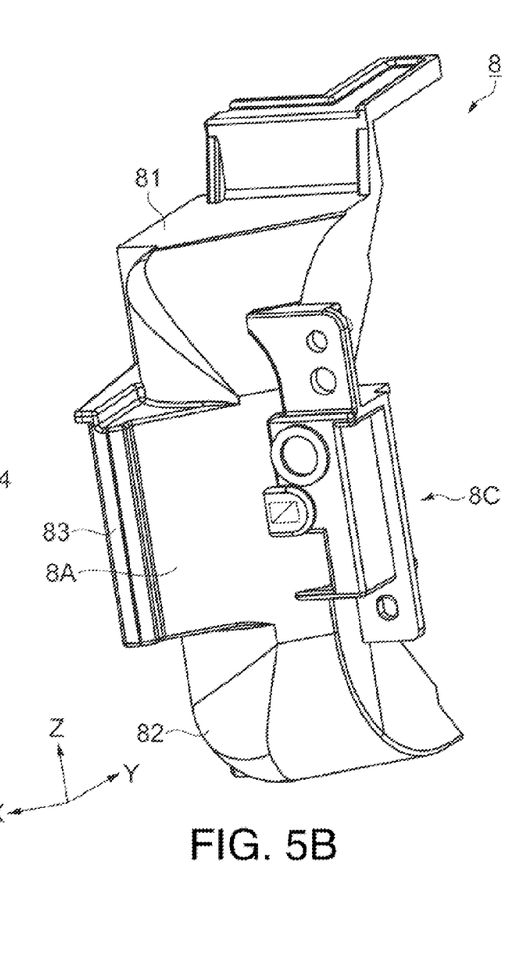

FIGS. 5A and 5B are perspective views illustrating the duct member 8. FIG. 5A illustrates the duct member 8 viewed from the inside, and FIG. 5B is the duct member 8 viewed from the outside.

The duct member 8 is formed into a box shape opening on the +Y side, and includes a first duct portion 81 configured to cover the inclined surface portion 74 (see FIG. 4) of the housing body 7, a second duct portion 82 configured to cover the inclined surface portion 75 (see FIG. 4), and a duct center portion 83 configured to cover the body side surface 71 (see FIG. 4) between the inclined surface portion 74 and the inclined surface portion 75 as illustrated in FIG. 5A. Then, a peripheral edge of the duct member 8 is formed so as to extend along the body side surface 71, the wall portions 72 and 73, and the inclined surface portions 74 and 75 of the housing body 7.

The duct center portion 83 includes a wall portion (the duct side surface 8A) on the −Y side, a wall portion 8B on the +X side, and a wall portion 8C on the −X side as illustrated in FIGS. 5A and 5B.

The duct side surface 8A is inclined toward the +Y side as it extends in the −X direction, and the wall portion 8B includes the inflow port 831. The inflow port 831 is formed into a rectangular shape in plan view and allows entry of a flow of the cooling air fed from the sirocco fan 41 (see FIG. 1) in the direction along the optical axis 31L. Since the duct side surface 8A is formed to be inclined, a reduction in size of the light source housing 5 is achieved. A mesh-type member, which is not illustrated, is fitted inside the inflow port 831 and the exhaust port (which is not illustrated) of the housing body 7 to prevent broken pieces from flying outward around in case of breakage of the light-emitting tube 3111.

The wall portion 8C is depressed at an edge 832 on the −X side, and when the duct member 8 is mounted on the housing body 7, an auxiliary circulation port 13 is formed between the edge 832 and the housing body 7 as illustrated in FIG. 5A. The auxiliary circulation port 13 is formed at a position opposing the through hole 76 (see FIG. 4) of the housing body 7.

The first duct portion 81 includes a flow channel 11 defined in cooperation with the inclined surface portion 74 of the housing body 7. The flow channel 11 introduces cooling air entering from the inflow port 831, and the introduced cooling air flows out from the outflow port 74a of the housing body 7 into the housing body 7.

The second duct portion 82 includes a flow channel 12 defined in cooperation with the inclined surface portion 75 of the housing body 7. The flow channel 12 introduces cooling air entering from the inflow port 831, and the introduced cooling air flows out from the outflow port 75a of the housing body 7 into the housing body 7.

In a state in which the projector 1 is in the standing position, the flow channel 11 corresponds to a first flow channel, and the flow channel 12 corresponds to a second flow channel. In a state in which the projector 1 is in the suspending position, the flow channel 11 corresponds to the second flow channel, and the flow channel 12 corresponds to the first flow channel.

A bearing 833 and a rotation stopper portion 834 are provided on an inner surface of the duct side surface 8A as illustrated in FIG. 5A.

The bearing 833 is a circular depression in plan view about a center at a center axis 833j, which is coaxial with the center axis 711j, and provided at a position opposing the bearing 711 (see FIG. 4) of the housing body 7. The rotating shaft 62 (see FIG. 6A), which is described later, of the rectifying unit 6 is inserted into the bearing 833. The duct side surface 8A rotatably supports the rectifying unit 6 in cooperation with the body side surface 71 of the housing body 7 as described above.

A guiding portion 8331 extending in the +Y direction along the bearing 833 is provided in a peripheral edge of the bearing 833 on the −X side.

The rotation stopper portion 834 is formed at a position opposing the rotation stopper portions 712 of the housing body 7, and has a function for limiting a range of rotation of the rectifying unit 6 in the same manner as the rotation stopper portions 712. Specifically, the rotation stopper portion 834 is provided on the inner surface of the duct side surface 8A, and includes a rotation stopper portions 834a and 834b formed at positions respectively opposing the rotation stopper portions 712a and 712b of the housing body 7. The rotation stopper portions 834a and 834b extend respectively from a position in the vicinity of the bearing 833 toward the inflow port 831.

A pair of projecting portions 835 projecting toward the rotation stopper portion 834 are formed on an inner surface of the wall portion 8B as illustrated in FIG. 5A. Specifically, the projecting portions 835 include a projecting portion 835a connected to an end of the rotation stopper portion 834a on the inflow port 831 side, and a projecting portion 835b connected to an end of the rotation stopper portion 834b on the inflow port 831 side.

The cover 9 is configured to be combined to the housing body 7 on the −X side, and cover the reflector 312 on the −X side as illustrated in FIG. 3. The cover 9 is provided with a circulating port 91 which allows entry of a flow of cooling air and the gripping portion 92 formed so as to be connected to an exhaust port, which is not illustrated, and the gripping portion 721 of the housing body 7 as illustrated in FIG. 3.

Subsequently, the rectifying unit 6 will be described.

The rectifying unit 6 is arranged inside of the duct member 8, and is rotatably supported by the housing body 7 and the duct member 8.

Figure 6A:
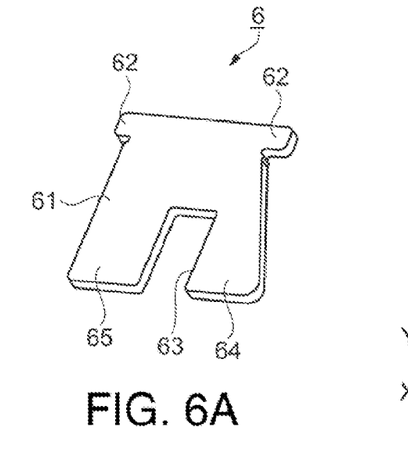
FIGS. 6A to 6C are drawings for describing a rectifying unit of the first embodiment.
Figure 6B:
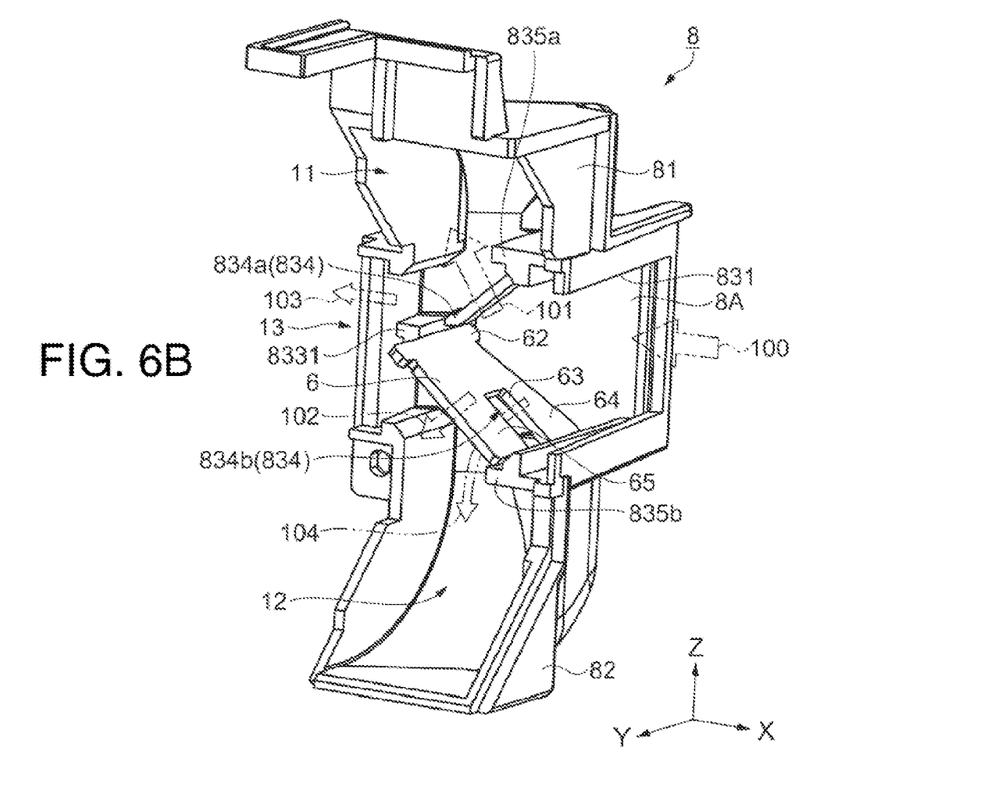
Figure 6C:
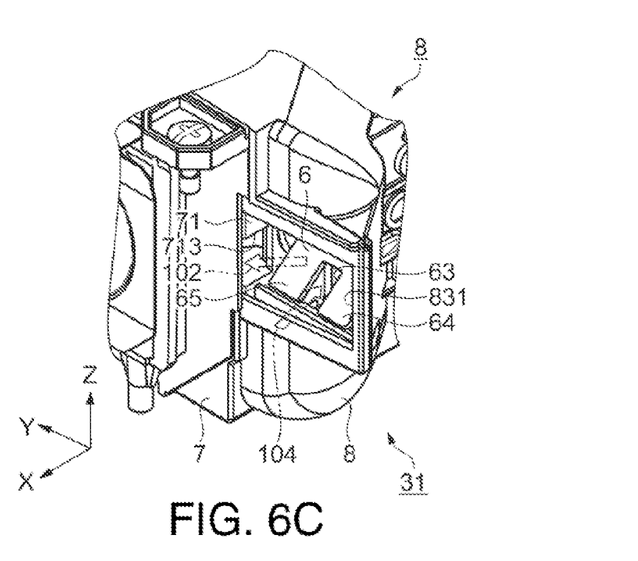

FIGS. 6A and 6B are drawings for explaining the rectifying unit 6. FIG. 6A is a perspective view of the rectifying unit 6, FIG. 6B is a perspective view illustrating the rectifying unit 6 and the duct member 8 in the standing position, and FIG. 6C is a perspective view illustrating the light source unit 31 in the standing position in the vicinity of the rectifying unit 6.

The rectifying unit 6 is formed of a metal plate, and includes a rectifying unit body 61 having a trapezoidal shape in plan view, and the rotating shaft 62 provided on a side of the short side of the rectifying unit body 61 as illustrated in FIG. 6A. The rectifying unit body 61 includes a notched opening 63 at an end thereof on a side of the long side, which is a side opposite from the rotating shaft 62, and a first end 64 and a second end 65 are provided on both sides of the opening 63.

The rectifying unit body 61 extends along the inner surface of the duct side surface 8A, and is formed to have a shape which can be placed on the rotation stopper portions 712 (see FIG. 4) of the housing body 7, the rotation stopper portion 834 and the projecting portions 835 of the duct member 8 as illustrated in FIG. 6B.

The rotating shaft 62 projects from both sides of the rectifying unit body 61, and is formed to have a size which is allowed to be inserted into the bearing 711 of the housing body 7 and the bearing 833 of the duct member 8.

The rectifying unit 6 is arranged in the duct member 8 so that the first end 64 is positioned on the duct member 8 side, and then, the duct member 8 is fixed to the housing body 7 with a screw. In this configuration, the rectifying unit 6 is rotatably supported by the housing body 7 and the duct member 8. Specifically, the rectifying unit 6 is guided by the guiding portion 8331 of the duct member 8 from an end on the rotating shaft 62 side and is inserted at one end of the rotating shaft 62 into the bearing 833 of the duct member 8, thereby being placed on the rotation stopper portion 834b and the projecting portion 835b of the duct member 8 as illustrated in FIG. 6B. Then, the duct member 8 on which the rectifying unit 6 is placed is inserted at the other end of the rotating shaft 62 of the rectifying unit 6 into the bearing 711 (see FIG. 4) of the housing body 7, and is fixed to the housing body 7 by a screw SC (FIG. 3).

In this manner, the rectifying unit 6 is arranged on the duct member 8 so that the first end 64 is positioned on the duct member 8 side and the second end 65 is positioned on the housing body 7 side. The rectifying unit 6 is supported by the housing body 7 and the duct member 8 so as to rotate about the center axes 711j and 833j which extend orthogonally to the perpendicular plane including the optical axis 31L of the light source 311. In this embodiment, the rectifying unit 6 is configured so as to rotate about the center axes 711j and 833j which extend orthogonally to the perpendicular plane including the optical axis 31L. However, what is essential is that the rectifying unit 6 is configured so as to rotate about the center axis which intersects the perpendicular plane.

Figure 7:
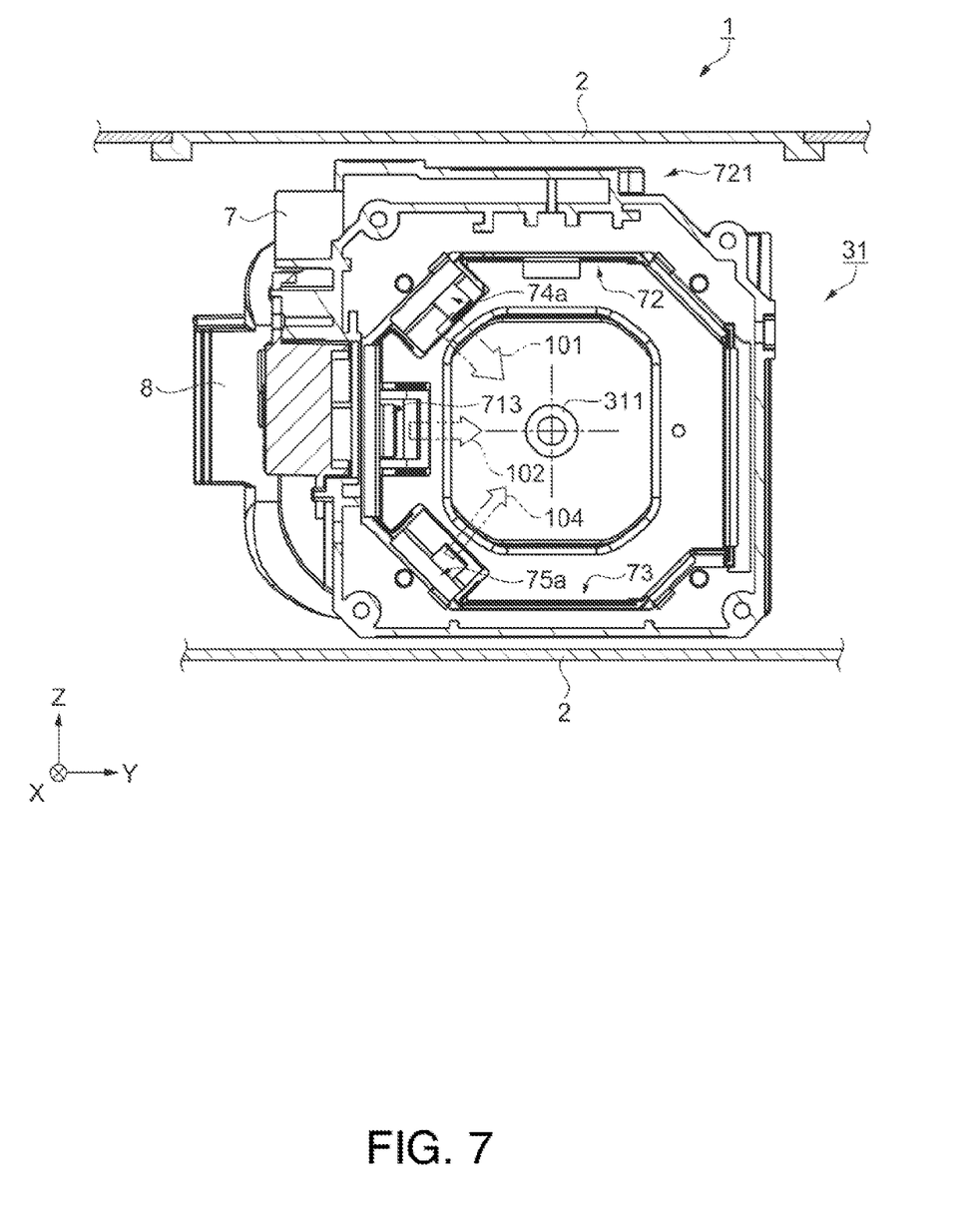
FIG. 7 is a cross-sectional view of the projector of the first embodiment in a standing position.

FIG. 7 is a cross-sectional view of the projector 1 in the standing position viewed from the −X side, and is a drawing illustrating a portion in the vicinity of the light source unit 31.

The light source unit 31 is arranged at the proximity to an inner surface of the external housing 2 in the Z direction as illustrated in FIG. 7. The light source unit 31 is provided with the gripping portion 721 on the wall portion 72 of the housing body 7 on the +Z side. Therefore, the light source unit 31 is arranged in particular with the −Z side, that is, the wall portion 73 of the housing body 7 which is positioned on the lower side in the standing position, is positioned in the proximity of the inner surface of the external housing 2 in comparison with the wall portion 72 which is positioned on the upper side in the same position. In this manner, owing to the arrangement of the light source unit 31 in the proximity of the inner surface of the external housing 2 in the Z direction, a reduction of the thickness of the projector 1 is achieved.

Flow of Cooling Air

Now, a flow of cooling air fed from the sirocco fan 41 will be described.

First of all, a flow of cooling air in the case where the projector 1 is placed in the standing position will be described with reference to FIGS. 6A to 6C and FIG. 7.

When the projector 1 is in the standing position, the rectifying unit 6 comes into abutment with the rotation stopper portion 712b (see FIG. 4) of the housing body 7, the rotation stopper portion 834b and the projecting portion 835b of the duct member 8 under its own weight as illustrated in FIG. 6B. The rectifying unit 6 is then located at a position in the −Z direction of the inlet port 713 of the housing body 7, so that the second end 65 is positioned in the proximity of the inlet port 713 as illustrated in FIG. 6C. As illustrated in FIG. 6B, the auxiliary circulation port 13 opens by substantially a half on the +Z side when viewed from the inflow port 831 side.

A large part of cooling air 100 fed from the sirocco fan 41 and enters from the inflow port 831 hits against the rectifying unit 6 and is branched into cooling air 101 flowing toward the flow channel 11, cooling air 102 flowing toward the inlet port 713, and cooling air 103 flowing toward the auxiliary circulation port 13 opening by substantially a half on the +Z side, and part of the cooling air 100 flows from the opening 63 of the rectifying unit 6 to the flow channel 12 (cooling air 104) as illustrated in FIGS. 6B and 6C.

In the standing position, the cooling air 101 flowing through the flow channel 11, which corresponds to the first flow channel, flows out from the outflow port 74a of the housing body 7 and cools the upper portion of the light source 311 as illustrated in FIG. 7. More specifically, the cooling air 101 cools the upper portion of the light-emitting portion 3111a of the light-emitting tube 3111. The cooling air 101 also cools portions of the housing body 7 and the duct member 8 which define the flow channel 11, and the wall portion 72, which corresponds to the upper side of the housing body 7.

The cooling air 102 entering from the inlet port 713 cools from the side of the light source 311 to the sealing portion 3111b (see FIG. 2) as illustrated in FIG. 7.

The cooling air 103 entering from the auxiliary circulation port 13 enters the cover 9 (see FIG. 3) through the through hole 76, passes on the outside of the reflector 312, and cools a portion of the sealing portion 3111c (see FIG. 2) of the light source 311 in the vicinity of a distal end portion thereof as illustrated in FIG. 4.

In the standing position, the cooling air 104 flowing through the flow channel 12, which corresponds to the second flow channel, flows out from the outflow port 75a of the housing body 7 and cools the lower portion of the light source 311 as illustrated in FIG. 7. The cooling air 104 also cools portions of the housing body 7 and the duct member 8 which define the flow channel 12, and the wall portion 73, which corresponds to the lower side of the housing body 7.

Since the rectifying unit 6 is provided with the first end 64 and the second end 65 on the both sides of the opening 63, the cooling air entering from the opening 63 to the flow channel 12 is prevented from hitting directly against the inner surfaces of the duct side surface 8A and the body side surface 71, and hence flows smoothly in the flow channel 12.

Then, the air that has cooled an object to be cooled by flowing through the flow channels 11 and 12, and the inlet port 713 is discharged to the outside of the external housing 2 by the axial flow fan 42 via the exhaust port (which is not illustrated) of the housing body 7. On the other hand, the air that has cooled the object to be cooled by flowing through the auxiliary circulation port 13 is discharged to the outside of the external housing 2 by the axial flow fan 42 via the exhaust port (which is not illustrated) of the cover 9.

Subsequently, a case where the projector 1 is in the suspending position will be described.

When the projector 1 is changed from the standing position to the suspending position, although illustration is omitted, the rectifying unit 6 rotates under its own weight and comes into abutment with the rotation stopper portion 712a (see FIG. 4) of the housing body 7, the rotation stopper portion 834a and the projecting portion 835a of the duct member 8 (see FIG. 6B). The rectifying unit 6 is then located at a position in the +Z direction of the inlet port 713 of the housing body 7, so that the second end 65 is positioned in the proximity of the inlet port 713 in the same manner as in the standing position. The auxiliary circulation port 13 (see FIG. 6B), opens by substantially a half on the −Z side when viewed from the inflow port 831 side.

The large part of the cooling air 100 fed from the sirocco fan 41 and enters from the inflow port 831 hits against the rectifying unit 6 and is branched into cooling air flowing toward the flow channel 12, cooling air flowing toward the inlet port 713, and cooling air flowing toward the auxiliary circulation port 13 opening by substantially a half on the −Z side, and part of the cooling air 100 flows from the opening 63 of the rectifying unit 6 to the flow channel 11.

Figure 8:
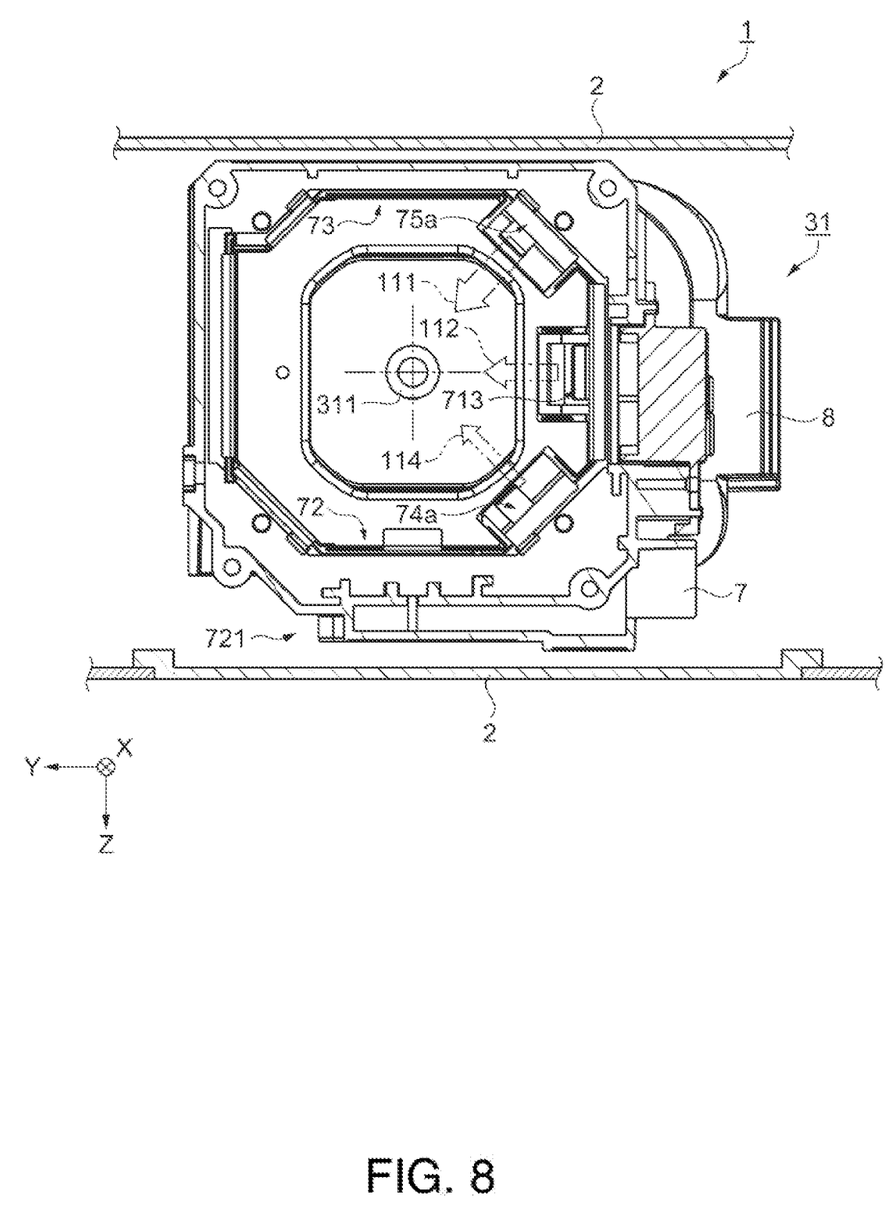
FIG. 8 is a cross-sectional view of the projector of the first embodiment in a suspending position.

FIG. 8 is a cross-sectional view of the projector 1 in the suspending position viewed from the −X side, and is a drawing illustrating a portion in the vicinity of the light source unit 31.

In the suspending position, cooling air flowing through the flow channel 12, which corresponds to the first flow channel, flows out from the outflow port 75a of the housing body 7 (cooling air 111) and cools the upper portion of the light source 311 as illustrated in FIG. 8. The cooling air 111 also cools portions of the housing body 7 and the duct member 8 which define the flow channel 12, and the wall portion 73, which corresponds to the upper side of the housing body 7.

In the same manner as the case of the standing position, cooling air entering from the inlet port 713 cools from the side of the light source 311 to a portion of the sealing portion 3111b (see FIG. 2) in the vicinity of the distal end portion thereof (cooling air 112) as illustrated in FIG. 8.

In the same manner as the case of the standing position, the cooling air entering from the auxiliary circulation port 13 enters the cover 9 (see FIG. 3) through the through hole 76, and cools a portion of the sealing portion 3111c (see FIG. 2) of the light source 311 in the vicinity of a distal end portion thereof.

In the suspending position, cooling air flowing through the flow channel 11, which corresponds to the second flow channel, flows out from the outflow port 74a of the housing body 7 (cooling air 114) and cools the lower portion of the light source 311 as illustrated in FIG. 8. The cooling air 114 also cools portions of the housing body 7 and the duct member 8 which define the flow channel 11, and the wall portion 72, which corresponds to the lower side of the housing body 7.

Since the rectifying unit 6 is provided with the first end 64 and the second end 65 on the both sides, in the same manner as the case of the standing position, the cooling air entering from the opening 63 to the flow channel 11 is prevented from hitting directly against the inner surfaces of the duct side surface 8A and the body side surface 71, and hence flows smoothly in the flow channel 11.

In this manner, in the standing position and the suspending position of the projector 1, the light source unit 31 is configured to allow a larger amount of cooling air to flow in the first flow channel than in the second flow channel to allow the cooling air to flow out toward the upper portion of the light source 311, and allow the cooling air to flow through the second flow channel to cause the cooling air to flow out toward the lower portion of the light source 311 and the housing body 7.

In the standing position and the suspending position of the projector 1, the light source unit 31 allows the cooling air to enter from the inlet port 713 and the auxiliary circulation port 13 to cause the cooling air to flow through both end portions of the light source 311.

As described thus far, according to the embodiment, the following effects are achieved.

(1) Since the light source unit 31 is provided with the first flow channel, the second flow channel, and the rectifying unit 6 having the opening 63, even when the projector 1 is inverted upside down, the larger amount of cooling air is guided to the upper portion of the light source 311 than to the lower portion, so that the upper portion and the lower portion of the light source 311 are cooled in the right equilibrium. Since the cooling air is also caused to flow through the second flow channel, the light source housing 5 positioned below the light source is also cooled. Therefore, the light source unit with longer lifetime even in a usage in the position inverted upside down is provided.

Since the light source housing 5 is cooled efficiently, even though the light source unit 31 is positioned in the vicinity of the external housing 2, the external housing 2 is prevented from deterioration due to the temperature. Therefore, the projector 1 which achieves stable projection for a long term both in the standing position and the suspending position while achieving the reduction in size is provided.

(2) The rectifying unit 6 is supported by the housing body 7 and the duct member 8, and is configured to rotate about the center axes 711*j* and 833*j* intersecting the perpendicular plane including the optical axis 31L of the light source 311. Accordingly, a configuration in which the rectifying unit 6 can be rotated under its own weight is achieved in a simple configuration, the cooling air entering from the direction along the optical axis 31L is allowed to flow mainly in the first flow channel, and part of the entering cooling air is allowed to flow into the second flow channel.

The inflow port 831 is formed so as to allow the cooling air to enter from the direction along the optical axis 31L. Accordingly, space saving in the direction orthogonal to the optical axis 31L (−Y direction) is achieved, so that the sirocco fan 41 may be arranged and, consequently, suppression of an increase in size of the projector 1 is achieved.

In this structure, since the light source 311 is hardly visible from the inflow port 831, light leakage from the projector 1 in the −Y direction is suppressed.

(3) The rectifying unit 6 is provided with the first end 64 on the duct side surface 8A side of the opening 63. Accordingly, the cooling air flowing from the opening 63 into the second flow channel is suppressed from hitting directly against the duct side surface 8A, whereby a turbulence caused by hitting of the cooling air against the rotation stopper portion 834*b* or the like, for example, is suppressed, so that the cooling air is allowed to flow efficiently in the second flow channel.

Since the rectifying unit 6 may be arranged stably in the duct member 8 by an abutment of the first end 64 with the duct member 8, the duct member 8 on which the rectifying unit 6 is arranged is easily mounted on the housing body 7. Therefore, simplification of assembly of the light source unit 31 is achieved.

(4) Since the inlet port 713 configured to allow part of the cooling air flowing from the inflow port 831 to introduce in the standing position and the suspending position is provided in the housing body 7, the sealing portion 3111*b* can be cooled from a portion other than the upper portion and the lower portion of the light source 311.

Since the housing body 7 is provided with the auxiliary circulation port 13, the sealing portion 3111*c* positioned on the back side of the reflector 312 is cooled.

Therefore, the light source unit 31 configured to be capable of cooling the light source 311 further efficiently is provided.

(5) The rectifying unit 6 is provided with the second end 65 on the body side surface 71 side of the opening 63. Accordingly, the cooling air flowing from the opening 63 into the second flow channel is suppressed from hitting directly against the body side surface 71, whereby a turbulence caused by the cooling air hitting against the rotation stopper portion 712*b* or the like, for example, is suppressed, so that the cooling air is allowed to flow efficiently in the second flow channel.

The second end 65 is positioned in the vicinity of the inlet port 713 in the standing position and the suspending position, the cooling air may be introduced to the inlet port 713 efficiently by the second end 65.

(6) The rectifying unit 6 includes the rectifying unit body 61 formed into a trapezoidal shape, and the rotating shaft 62 is provided on the side of the short side, and the opening 63 is provided at the end on the side of the long side. Accordingly, even when the duct side surface 8A is formed so as to be inclined, the rectifying unit 6 may be accommodated in the duct member 8, so that the rectifying unit 6 having the opening 63 of a desired shape is ensured. Therefore, by saving the space for accommodating the rectifying unit 6, by reducing the size of the light source unit 31, the light source unit 31 in which a desired amount of cooling air is flowed in the first flow channel and the second flow channel is provided.

Second Embodiment

Referring now to the drawings, a light source unit 131 according to a second embodiment will be described. In the following description, the same configurations and same members as the light source unit 31 of the first embodiment are designated by the same reference numeral, and detailed description will be omitted or simplified.

The light source unit 131 of the second embodiment is provided with a rectifying unit 16 having a different shape from the rectifying unit 6 in the light source unit 31 of the first embodiment.

Figure 9A:
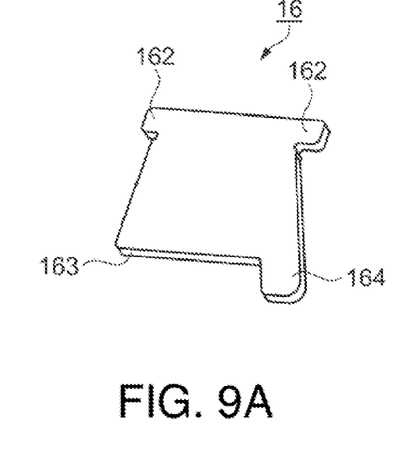
FIGS. 9A to 9C are drawings for describing a rectifying unit of a second embodiment.
Figure 9B:
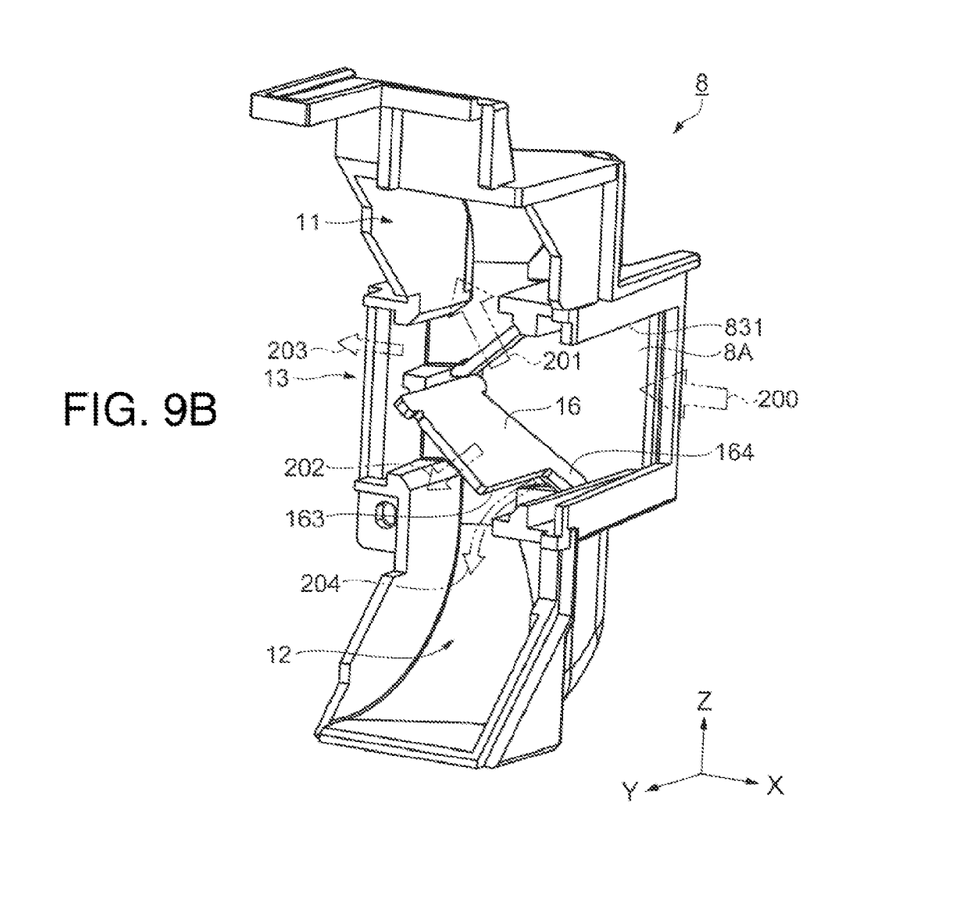
Figure 9C:
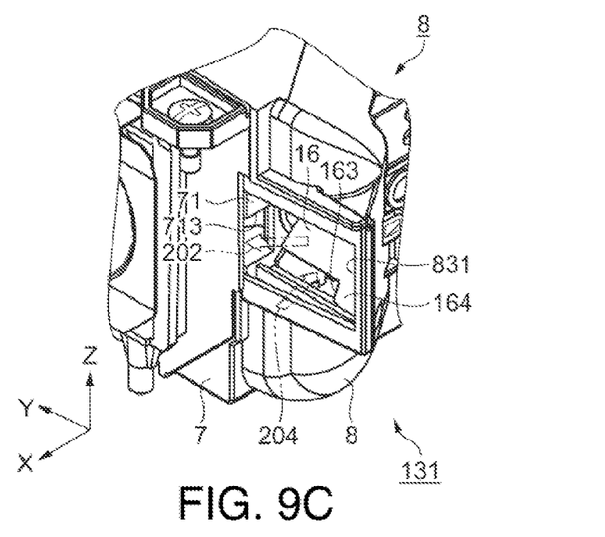

FIGS. 9A and 9B are drawings for explaining the rectifying unit 16. FIG. 9A is a perspective view of the rectifying unit 16, FIG. 9B is a perspective view illustrating the rectifying unit 16 and the duct member 8 in the standing position, and FIG. 9C is a perspective view illustrating the light source unit 131 in the standing position in the vicinity of the rectifying unit 16.

The rectifying unit 16 is formed of a metal plate, and includes an opening 163 having a different shape from the opening 63 in the rectifying unit 6 of the first embodiment as illustrated in FIG. 9A. The opening 163 is formed into a notched shape at an end on the long side on the opposite side to a rotating shaft 162, and a first end portion 164 is provided on the duct member 8 side of the opening 163. Then, the opening 163 is provided to an edge end of the rectifying unit 16 on the body side surface 71 side.

The rectifying unit 16 is arranged on the duct member 8 so that the first end portion 164 side is positioned on the duct side surface 8A side in the same manner as the rectifying unit 6 of the first embodiment as illustrated in FIG. 9B. Then, the duct member 8 is fixed to the housing body 7 with a screw, and hence the rectifying unit 16 is rotatably supported by the housing body 7 and the duct member 8.

Now, a flow of cooling air fed from the sirocco fan 41 will be described.

First of all, a flow of cooling air in the case where the projector 1 is placed in the standing position will be described.

Cooling air 200 fed from the sirocco fan 41 and enters from the inflow port 831 is branched in the same manner as in the first embodiment into cooling air 201 flowing toward the flow channel 11, cooling air 202 flowing toward the inlet port 713, and cooling air flowing toward the auxiliary circulation port 13 (which is not illustrated), and cooling air 204 flowing from the opening 163 to the flow channel 12 as illustrated in FIGS. 9B and 9C.

The cooling air 201 and cooling air 203 flowing toward the auxiliary circulation port 13 are fed to an object to be cooled by the substantially same amount as that described in the first embodiment. In contrast, since the shape of the opening 163 is different from the shape of the opening 63 of the first embodiment, different amounts of the cooling air 202 and the cooling air 204 from the amounts of air described in the first embodiment are fed.

Specifically, since an end is not formed on the body side surface 71 side of the opening 163, the cooling air introduced by the second end 65 (see FIG. 6A) in the first embodiment is not introduced, and flows in the second flow channel (the flow channel 12 in the standing position). In other words, the amount of the cooling air flowing in the inlet port 713 in the second embodiment is smaller than the amount of cooling air flowing into the inlet port 713 in the first embodiment. The amount of the cooling air flowing in the second flow channel in the second embodiment is larger than the amount of cooling air flowing into the second flow channel in the first embodiment. In other words, although the amount of cooling air fed to the sealing portion 3111b in the light source unit 131 of the second embodiment is smaller than that in the light source unit 31 of the first embodiment, the amount of the cooling air fed to the lower portion of the light source 311 and the wall portion 73, which comes to the lower side of the housing body 7 is increased.

In the suspending position as well, although the amount of the cooling air fed to the sealing portion 3111b in the light source unit 131 of the second embodiment is smaller than that in the light source unit 31 of the first embodiment, the amount of the cooling air fed to the lower portion of the light source 311 and the wall portion 72, which comes to the lower side of the housing body 7 is increased although illustration is omitted.

As described thus far, according to the embodiment, the following effects are achieved.

The rectifying unit 16 of the second embodiment is configured to reduce the amount of cooling air that enters the inlet port 713 and allow a larger amount of cooling air to flow in the second flow channel in comparison with the configuration in which the rectifying unit 6 includes the second end 65. Accordingly, in a case where the light source unit 131 includes the light source 311 which requires cooling of the lower side thereof or the light source housing in the vicinity of the lower portion, the upper portion and the lower portion of the light source 311 are cooled in the right equilibrium, and the light source housing 5 and the like located below the light source 311 are also cooled, so that the light source unit 131 which achieves longer lifetime in the usage in the position inverted upside down is provided.

Modification

The embodiment described above may be modified as described below.

In the embodiments described above, the openings 63 and 163 are formed into a notched shape. However, a hole shape is also applicable.

Although the rectifying units 6, 16 are formed of a metal plate, the material is not limited to the metal plate, and the rectifying units 6, 16 may be formed by molding fused metal with a mold, and may be formed of a synthetic resin instead of metals.

Although the projector 1 in the embodiment described above employs the transmissive liquid crystal panel as the light-modulating unit, a reflective liquid crystal panel may also be employed. The light-modulating unit may employ a micro mirror display device.

The light-modulating unit of the embodiments described above employs a so-called three-panel system, in which three light-modulating units corresponding to R-light, G-light, and B-light are used. Instead, however, a single plate system may also be employed. Alternatively, the light-modulating unit of the embodiments described above may also be applied to a projector including two, four or more of the light-modulating units.

When comparing the amounts of cooling air flowing in the respective flow channels in the second embodiment with the amount of cooling air flowing in the respective flow channels in the first embodiment, the cooling air 201 flowing in the flow channel 11 and the cooling air 203 flowing toward the auxiliary circulation port 13 are substantially the same amount, the amount of the cooling air 202 flowing toward the inlet port 713 is reduced, and the amount of the cooling air 204 flowing from the opening 163 to the flow channel 12 is increased. However, this disclosure is not limited thereto, and the amounts of the cooling air 201 and the cooling air 203 may be configured to be different from the amount of the cooling air flowing in the flow channels 11 and 13 of the first embodiment.

CROSS REFERENCE TO RELATED APPLICATIONS

This application claims priority to Japanese Patent Application No. 2013-063559 filed on Mar. 26, 2013, the entire contents of which are incorporated by reference herein.

What is claimed is:

1. A light source unit comprising:
a light source;
a reflector configured to reflect light emitted from the light source;
a light source housing configured to accommodate the light source and the reflector and including:
an inflow port through which cooling air enters,
a first flow channel and a second flow channel that guide the cooling air entering from the inflow port to an upper portion and a lower portion of the light source respectively, and
an inlet port that guides cooling air to a side portion of the light source; and
a rectifying unit configured to rotate and cause the cooling air entering from the inflow port to flow in the first flow channel,
wherein
the rectifying unit is provided with an opening configured to cause part of the cooling air entering from the inflow port to flow in the second flow channel,
the inlet port is disposed adjacent to the rectifying unit, and
the rectifying unit branches the cooling air in three streams divided between the first flow channel, the second flow channel, and the inlet port, an amount of cooling air in the first flow channel being larger than an amount of cooling air in the second flow channel and an amount of cooling air in the inlet port.

2. The light source unit according to claim 1, wherein the rectifying unit is provided with a center axis of rotation at one end side, and the opening at the other end side.

3. The light source unit according to claim 2, wherein the light source housing includes:
a housing body configured to accommodate the light source and the reflector, and
a duct member configured to define the first flow channel and the second flow channel in cooperation with the housing body,
the housing body includes a body side surface configured to support one side of the rectifying unit, the body side surface includes inlet port configured to introduce part of the cooling air entering from the inflow port to the interior of the housing body, the inflow port allows entry of the cooling air from a direction along an optical axis of the light source, and the rectifying unit is supported by the housing body and the duct member so as to rotate about the center axis that intersects a perpendicular plane including the optical axis.

4. The light source unit according to claim 3, wherein the duct member includes a duct side surface configured to supporter another side of the rectifying unit, and the rectifying unit includes a first end on a duct-side-surface side of the opening.

5. The light source unit according to claim 4, wherein the rectifying unit includes a second end on the body-side-surface side of the opening.

6. The light source unit according to claim 4, wherein the opening of the rectifying unit is provided to an edge end on the body-side-surface side of the rectifying unit.

7. A projector comprising:
the light source unit according to claim 1;
a light-modulating unit configured to modulate light emitted from the light source unit in accordance with image information; and
a projection lens configured to project the light modulated by the light-modulating unit.

8. The projector according to claim 7, wherein the rectifying unit is provided with a center axis of rotation at one end side, and the opening at the other end side.

9. The projector according to claim 8, wherein the light source housing includes:
a housing body configured to accommodate the light source and the reflector, and
a duct member configured to define the first flow channel and the second flow channel in cooperation with the housing body,
the inflow port allows entry of the cooling air from a direction along an optical axis of the light source, and
the rectifying unit is supported by the housing body and the duct member so as to rotate about the center axis that intersects a perpendicular plane including the optical axis.

10. The projector according to claim 9, wherein the duct member includes a duct side surface configured to support one side of the rectifying unit, and
the rectifying unit includes a first end on the duct-side-surface side of the opening.

11. The projector according to claim 10, wherein the housing body includes a body side surface configured to support the other side of the rectifying unit,
the body side surface includes the inlet port configured to introduce part of the cooling air entering from the inflow port to the interior of the housing body, and
the rectifying unit includes a second end on the body-side-surface side of the opening.

12. The projector according to claim 10, wherein the housing body includes a body side surface configured to support the other side of the rectifying unit,
the body side surface includes the inlet port configured to introduce part of the cooling air entering from the inflow port to the interior of the housing body, and
the opening of the rectifying unit is provided to an edge end on the body-side-surface side of the rectifying unit.

13. The light source unit according to claim 1, wherein the inflow port is positioned parallel to an optical axis of the light source, along which light is emitted from the light source, and
cooling air enters the inflow port in a direction parallel to the optical axis.

14. The light source unit according to claim 5, wherein the second end of the rectifying unit is substantially perpendicular to the one end side and the other end side of the rectifying unit, and
the inlet port is disposed adjacent to the second end of the rectifying unit.

15. The light source unit according to claim 1, wherein an amount of cooling air in the inlet port is larger than an amount of cooling air in the second flow channel.

16. A light source unit comprising:
a light source;
a reflector configured to reflect light emitted from the light source;
a light source housing including:
a housing body configured to accommodate the light source and the reflector,
an inflow port through which cooling air enters,
a first flow channel and a second flow channel that guide the cooling air entering from the inflow port to an upper portion and a lower portion of the light source respectively, and
a duct member configured to define the first flow channel and the second flow channel in cooperation with the housing body;
a rectifying unit configured to rotate and cause the cooling air entering from the inflow port to flow in the first flow channel,
wherein
the rectifying unit is provided with an opening configured to cause part of the cooling air entering from the inflow port to flow in the second flow channel,
the housing body includes a body side surface configured to support one side of the rectifying unit,
the body side surface includes an inlet port configured to introduce part of the cooling air entering from the inflow port to the interior of the housing body,
the inflow port allows entry of the cooling air from a direction along an optical axis of the light source, and
the rectifying unit is supported by the housing body and the duct member so as to rotate about a center axis that intersects a perpendicular plane including the optical axis.

* * * * *